(12) United States Patent
Cavagnaro et al.

(10) Patent No.: US 10,036,393 B2
(45) Date of Patent: Jul. 31, 2018

(54) HIGH SPEED SWITCH RELUCTANCE MOTOR ON A TURBOCHARGER

(71) Applicant: BorgWarner Inc., Auburn Hills, MI (US)

(72) Inventors: Augustine Cavagnaro, Flat Rock, NC (US); Jason W. Chekansky, Asheville, NC (US); Robert T. Race, Arden, NC (US)

(73) Assignee: BorgWarner Inc., Auburn Hills, MI (US)

( * ) Notice: Subject to any disclaimer, the term of this patent is extended or adjusted under 35 U.S.C. 154(b) by 295 days.

(21) Appl. No.: 14/889,956

(22) PCT Filed: May 12, 2014

(86) PCT No.: PCT/US2014/037663
§ 371 (c)(1),
(2) Date: Nov. 9, 2015

(87) PCT Pub. No.: WO2014/189701
PCT Pub. Date: Nov. 27, 2014

(65) Prior Publication Data
US 2016/0153459 A1    Jun. 2, 2016

Related U.S. Application Data

(60) Provisional application No. 61/826,193, filed on May 22, 2013.

(51) Int. Cl.
| | | |
|---|---|---|
| *H02K 1/24* | (2006.01) | |
| *H02K 1/30* | (2006.01) | |
| *F04D 25/06* | (2006.01) | |
| *F02B 39/10* | (2006.01) | |
| *F02B 37/10* | (2006.01) | |
| *F02C 6/12* | (2006.01) | |
| *F01D 15/10* | (2006.01) | |

(Continued)

(52) U.S. Cl.
CPC .............. *F04D 25/06* (2013.01); *F01D 15/10* (2013.01); *F02B 37/10* (2013.01); *F02B 39/10* (2013.01); *F02C 6/12* (2013.01); *F04D 17/10* (2013.01); *H02K 1/246* (2013.01); *H02K 1/30* (2013.01); *F05D 2220/40* (2013.01); *H02K 19/103* (2013.01); *Y02T 10/144* (2013.01)

(58) Field of Classification Search
CPC ................................................ H02K 1/00–1/34
USPC ..................... 310/211, 212, 400, 410, 411, 310/216.001–216.137
See application file for complete search history.

(56) References Cited

U.S. PATENT DOCUMENTS

| | | | | |
|---|---|---|---|---|
| 4,568,903 | A | * | 2/1986 | Buckley ................ H01F 27/306 310/194 |
| 5,726,516 | A | | 3/1998 | Randall |
| 6,769,167 | B2 | | 8/2004 | Lee et al. |

(Continued)

FOREIGN PATENT DOCUMENTS

JP        2009213291 A  *  9/2009

OTHER PUBLICATIONS

Machine Translation, Suzuura et al., JP 2009213291 A, Sep. 2009.*

*Primary Examiner* — Thomas Truong
(74) *Attorney, Agent, or Firm* — Perkins Coie LLP

(57) ABSTRACT

A rotor assembly (164) is provided for a switched reluctance motor (160) in which nonmetallic, nonconductive pins (5) pass through a stack (2) of magnetic laminate plates (3).

13 Claims, 3 Drawing Sheets

(51) Int. Cl.
   *F04D 17/10*      (2006.01)
   *H02K 19/10*      (2006.01)

(56) References Cited

U.S. PATENT DOCUMENTS

| | | | |
|---|---|---|---|
| 6,845,617 | B1 | 1/2005 | Allen et al. |
| 2005/0034295 | A1* | 2/2005 | Meacham ............ F16C 32/0468 29/598 |
| 2006/0061227 | A1* | 3/2006 | Heideman ............ H02K 1/2773 310/156.56 |
| 2008/0179980 | A1* | 7/2008 | Dawsey ............... H02K 1/2766 310/156.53 |
| 2008/0315715 | A1 | 12/2008 | Wang et al. |
| 2009/0236951 | A1 | 9/2009 | Yoo et al. |
| 2013/0093279 | A1* | 4/2013 | Yokota ................. H02K 1/2766 310/156.53 |
| 2015/0222153 | A1* | 8/2015 | Lange ................... H02K 1/276 310/51 |

\* cited by examiner

HIGH SPEED SWITCH RELUCTANCE MOTOR ON A TURBOCHARGER

CROSS-REFERENCE TO RELATED APPLICATION

This application claims priority to and all the benefits of U.S. Provisional Application No. 61/826,193 filed on May 22, 2013, and entitled "A High Speed Switch Reluctance Motor On A Turbocharger" which is incorporated herein by reference.

BACKGROUND OF THE INVENTION

1. Field of the Invention

This invention relates to a hybrid turbocharger for an internal combustion engine. More particularly, this invention relates to a high speed switch reluctance motor for use in a hybrid turbocharger.

2. Brief Description of the Related Art

A turbocharger is a type of forced induction system used with internal combustion engines. Turbochargers deliver compressed air to an engine intake, allowing more fuel to be combusted, thus boosting an engine's power output without significantly increasing engine weight. Thus, turbochargers permit the use of smaller engines that develop the same amount of power as larger, normally aspirated engines. Using a smaller engine in a vehicle has the desired effect of decreasing the mass of the vehicle, increasing performance, and enhancing fuel economy. Moreover, the use of turbochargers permits more complete combustion of the fuel delivered to the engine, which contributes to the highly desirable goal of a reduced emissions.

Conventional turbochargers include a turbine housing connected to the engine's exhaust manifold, a compressor housing connected to the engine's intake manifold, and a center bearing housing coupling the turbine and compressor housings together. A turbine wheel in the turbine housing is rotatably driven by an inflow of exhaust gas supplied from the exhaust manifold. A shaft rotatably supported in the center bearing housing connects the turbine wheel to a compressor impeller in the compressor housing so that rotation of the turbine wheel causes rotation of the compressor impeller. As the compressor impeller rotates, it increases the air mass flow rate, airflow density and air pressure delivered to the engine's cylinders via the engine's intake manifold.

Turbochargers in which the turbine wheel is connected by a shaft to the compressor wheel tend to have a performance lag until the necessary exhaust energy is present to overcome the rotational inertia of the rotor assembly, and then reach the high rotation speeds required to provide the desired volume of air to the intake manifold. This performance delay is known as turbo lag. One solution to the problem of turbo lag is to couple the compressor wheel to an electric motor to drive the compressor stage until the necessary exhaust energy is present to power the turbine/compressor.

Switched reluctance motors may be used to drive the compressor. The switched reluctance motor (SRM) is a type of motor in which electric power is delivered to windings in the stator rather than the rotor. The electric current creates a magnetic field which pulls the rotor towards alignment with the stator poles. By switching the current from one set of poles of the stator to the next, the field is always ahead of the rotor and the rotor is pulled forward and thus rotates. The electric current is delivered to windings which surround poles in the stator portion of the motor. The rotor portion of the motor has no windings but instead has a core of soft magnetic material, typically laminated soft steel projections, generally in the shape of poles.

SUMMARY

In some aspects, a rotor assembly of a switched reluctance motor includes a shaft; a stack of magnetic laminated plates mounted on the shaft; a first collar mounted on the shaft at one end of the stack; a second collar mounted on the shaft at an opposed end of the stack; and nonconductive, nonmetallic pins that are configured to transmit rotational force of the stack to the shaft via the first collar and the second collar.

The rotor assembly may include one or more of the following features: The pins extend through the stack of magnetic laminated plates such that respective ends of the pins are connected to each of the first collar and the second collar; the pins are parallel to the shaft; and the first collar is not in contact with the stack of magnetic laminated plates, and the second collar is in contact with the stack of magnetic laminated plates. The assembly further includes a spring washer placed between the first collar and the stack of magnetic laminated plates. The assembly includes two to four pins. The pins are formed of a material selected from the group consisting of polyetherketones, polyimide resins, and phenolic resins. The pins are arranged symmetrically about a rotational axis of the shaft. The first collar and the second collar are fixed relative to the shaft. The respective ends of the pins are tightly fitted within openings in each of the first collar and the second collar.

In some aspects, an exhaust gas turbocharger includes a compressor section including a compressor wheel, a turbine section including a turbine wheel, a bearing housing that supports a shaft that connects the compressor wheel to the turbine wheel, and a switched reluctance motor disposed in the bearing housing. The motor includes a rotor assembly that includes a stack of magnetic laminated plates mounted on the shaft; a first collar mounted on the shaft at one end of the stack; a second collar mounted on the shaft at an opposed end of the stack; and nonconductive, nonmetallic pins that are configured to transmit rotational force of the stack to the shaft via the first collar and the second collar.

The turbocharger may include one or more of the following features: The pins extend through the stack of magnetic laminated plates such that respective ends of the pins are connected to each of the first collar and the second collar; the pins are parallel to the shaft; and the first collar is not in contact with the stack of magnetic laminated plates, and the second collar is in contact with the stack of magnetic laminated plates. The turbocharger further includes a spring washer placed between the first collar and the stack of magnetic laminated plates. The pins are arranged symmetrically about a rotational axis of the shaft. The first collar and the second collar are fixed relative to the shaft. The pins are formed of a material selected from the group consisting of polyetherketones, polyimide resins, and phenolic resins. The respective ends of the pins are tightly fitted within openings in each of the first collar and the second collar.

A turbocharger includes a switched reluctance motor to address turbolag. Due to the high speeds required (e.g., 100,000 rpm) and the low strength electrical steel used in switched reluctance motors designed for turbocharger applications, it is very difficult to retain the rotor on the turbocharger shaft and to retain the rotor in a desired orientation. To address these concerns, the turbocharger includes a switched reluctance motor. The motor includes a rotor assembly having magnetic laminated elements that are mounted on the shaft, and are held in place by nonmetallic nonconductive pins. In addition, the pins transmit the motion of the laminated elements to the shaft. By arranging the pins on opposing sides of the shaft, the motor torque is transmitted to the shaft, orientation of the laminated elements relative to the shaft is locked, balance of the rotor assembly is minimally affected, and the set of laminated elements is free to grow axially as necessary during operation of the turbocharger. In addition, it is possible to balance the rotor assembly prior to installation into the turbocharger.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION

Figure 1:
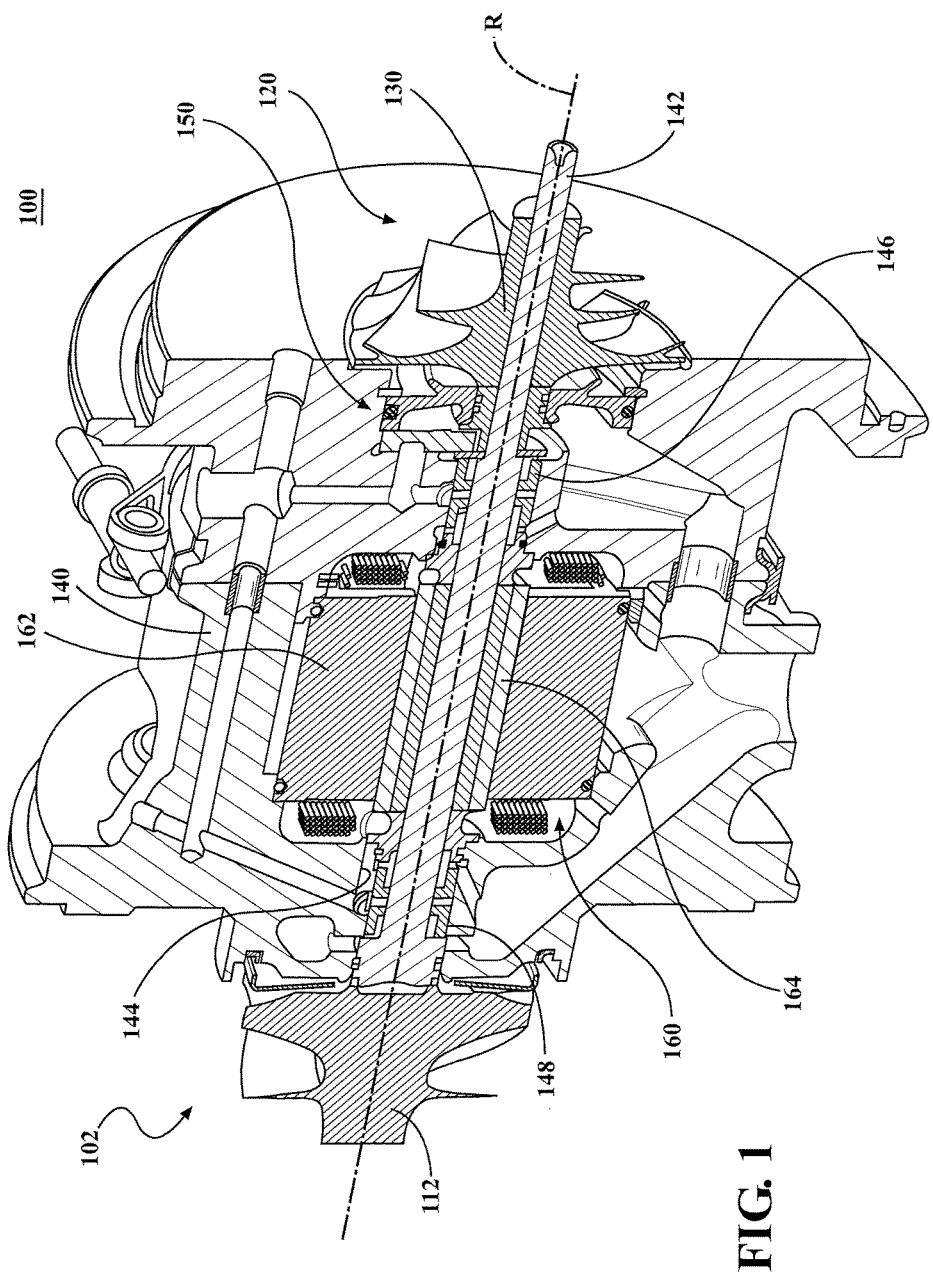
FIG. 1 is a side cross-sectional view of a turbocharger including a switched reluctance motor disposed on the shaft between the turbine section and the compressor section.

Referring to FIG. 1, an exhaust gas turbocharger 100 includes a turbine section 102, a compressor section 120, and a center bearing housing 140 disposed between and connecting the compressor section 120 to the turbine section 102. The turbine section 102 includes a turbine housing (not shown) that defines an exhaust gas inlet, an exhaust gas outlet, and a turbine volute disposed in the fluid path between the exhaust gas inlet and exhaust gas outlet. A turbine wheel 112 is disposed in the turbine housing between the turbine volute and the exhaust gas outlet.

The compressor section 120 includes a compressor housing (not shown) that defines an air inlet, an air outlet, and a compressor volute. A compressor wheel 130 is disposed in the compressor housing between the air inlet and the compressor volute.

A shaft 142 connects the turbine wheel 112 to the compressor wheel 130. The shaft 142 is supported for rotation about a rotational axis R within a bore 144 in the bearing housing 140 via a pair of axially spaced journal bearings 146, 148. For example, a compressor-side journal bearing 146 supports the shaft 142 adjacent the compressor section 120, and a turbine-side journal bearing 148 supports the shaft 142 adjacent to the turbine section 102. The axial spacing between the compressor-side journal bearing 146 and the turbine-side journal bearing 148 is maintained by a switched reluctance motor 160 disposed therebetween. In addition, a thrust bearing assembly 150 is disposed in the bearing housing 140 so as to provide axial support for the shaft 142.

In use, the turbine wheel 112 in the turbine housing is rotatably driven by an inflow of exhaust gas supplied from the exhaust manifold of an engine (not shown). Since the shaft 142 is rotatably supported in the bearing housing 140 and connects the turbine wheel 112 to the compressor wheel 130 in the compressor housing, the rotation of the turbine wheel 112 causes rotation of the compressor wheel 130. As the compressor wheel 130 rotates, it increases the air mass flow rate, airflow density and air pressure delivered to the engine's cylinders via an outflow from the compressor air outlet 126, which is connected to the engine's air intake manifold.

The turbocharger includes the switched reluctance motor 160 to address turbolag during vehicle startup and/or at low engine speeds. The motor 160 includes a stator 162 formed of wound field coils, and a rotor assembly 164 disposed within the stator 162 and configured to rotate relative thereto. The rotor assembly 164 is rotatably supported on the shaft 142 between the respective journal bearings 146, 148, and is configured to transmit the motor torque to the shaft 142, as discussed further below.

Figure 2:
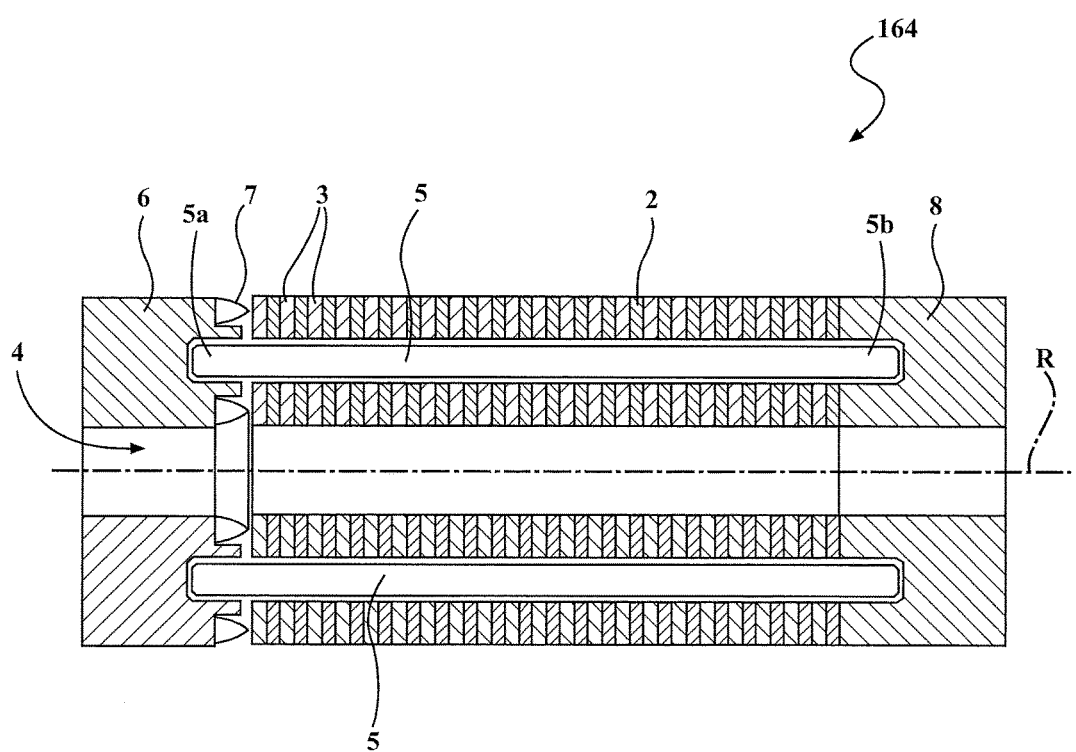
FIG. 2 is a side cross-sectional view of the motor rotor assembly isolated from the turbocharger.
Figure 3:
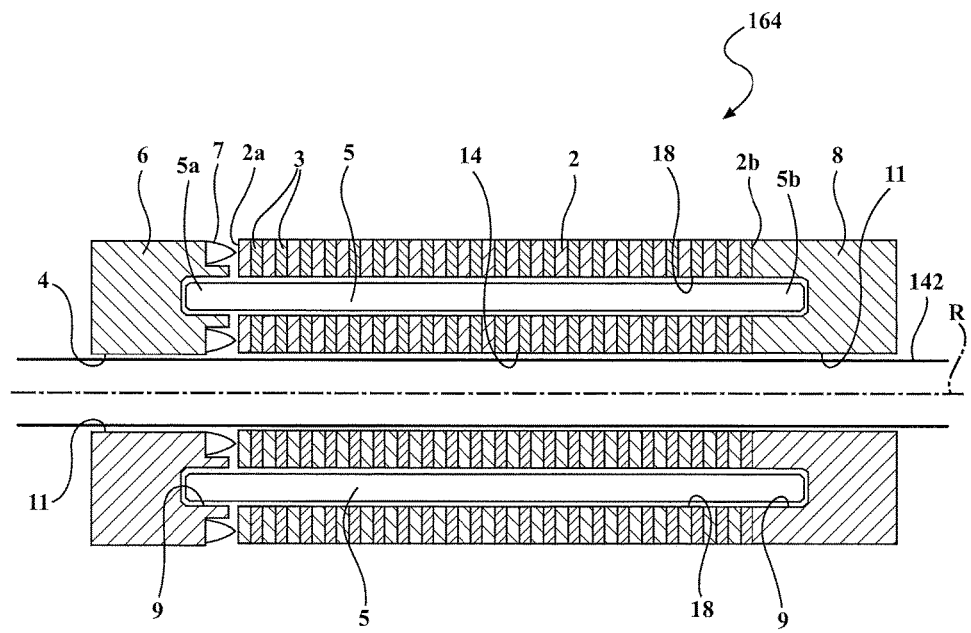
FIG. 3 is a side cross-sectional view of the motor rotor assembly having two nonmetallic nonconductive pins and the turbocharger shaft.
Figure 4:
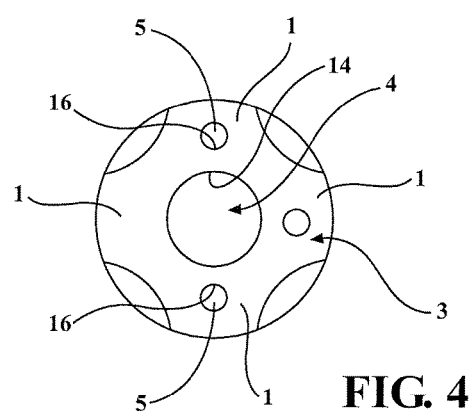
FIG. 4 shows an end view of the motor rotor assembly illustrating two nonmetallic nonconductive pins.

Referring to FIGS. 2-4, the rotor assembly 164 includes a stack 2 of laminated magnetic plates 3. For example, the plates 3 may be formed of steel. The individual laminated plates 3 are held together by a bonding agent, which provides electrical insulation. The shape of the stack 2 is defined by the shape of the individual magnetic laminated elements (e.g., plates 3). The plates 3 have a generally circular peripheral shape that includes outward projections that define the motor poles 1. For example, a rotor assembly 164 having four poles 1 would be formed by stacking magnetic laminated plates 3 having four projections. Two to eight poles 1 have been found to be appropriate for use in switched reluctance motors. Although the illustrated embodiment includes four poles 1 (FIG. 4), the rotor assembly 164 is not limited to having four poles.

Each of the magnetic laminated plates 3 includes a central opening 14, and the plates 3 are arranged so that when the plates 3 are stacked together the respective central openings 14 are axially aligned and define a hollow, tube-like central passageway 4 through the stack 2.

In addition, each of the magnetic laminated plates 3 has two or more non-central holes 16 dimensioned to receive a pin 5, and the plates 3 are arranged so that when the magnetic laminated metallic elements are stacked together the non-central holes 16 are axially aligned and define a hollow, tube-like pin passageway 18 through the stack 2. The number of holes 16 in each plate 3 that define the pin passageways 18 may be even or odd and can be lower or higher than the number of poles 1 in the rotor assembly 164. Two to eight holes have been found to be effective. The holes 16 may be arranged around the circumference of the plate 3 so as to be symmetric about the rotational axis R, but are not limited to this arrangement. In addition, the holes 16 may be lined up with (e.g., on a radial axis with) the poles 1, but need not line up with the poles 1. For example, a four-pole rotor assembly 164 could have two or three holes 16 arranged symmetrically.

The rotor assembly 164 includes nonmetallic nonconductive pins 5. A pin 5 is disposed in and extends through each pin passageway 18 defined by the stacked magnetic laminated plates 3. Each pin 5 has an axial length that is greater than the axial dimension of the stack 2 of laminated plates 3, such that the opposed ends 5a, 5b of the pins 5 protrude from each end of the stack 2.

The rotor assembly 164 also includes a pair of collars 6, 8 disposed on the shaft 142. The magnetic laminated plates 3 are retained on the nonmetallic nonconductive pins 5 by the pair of collars 6, 8. In particular, a first collar 6 is disposed on the first end 2a of the stack 2, and the second collar 8 is disposed on the second, opposed end 2b of the stack 2. Preferably, each collar 6, 8 covers the full cross-sectional area of the magnetic laminated plates 3. However, the collars 6, 8 need not have the exact shape of the magnetic laminated plates 3. For example, a circular collar could cover magnetic laminated plates 3 having four projections.

Each collar 6, 8 has a pin hole 9 that receives a corresponding pin end 5a, 5b, and provides a tight fit for the pin ends 5a, 5b, whereby the pins 5 are fixed to the collars 6, 8. Each collar 6, 8 also includes a central opening 11 through which the shaft 142 passes. The central openings 11 are dimensioned so that the collars 6, 8 are tightly fitted to the shaft 142. Accordingly, the torque generated by the plates 3 is transmitted through the nonmetallic nonconductive pins 5 to the collars 6, 8, and through the collars 6, 8 to the shaft 142. One collar (e.g., collar 8) is in contact with the magnetic laminated plates 3. The other collar (e.g., collar 6) is slightly separated from the stack 2 of magnetic laminated plates 3. Optionally, a spring washer 7 is mounted between the collar 6 and the stack 2 of magnetic laminated plates 3. The spring washer 7 maintains pressure on the stack 2 of magnetic laminated plates 3 when the motor 160 is cool. As the motor 160 becomes warmer, the spring washer 7 allows the stack 2 of magnetic laminated plates 3 to expand while maintaining a proper pressure on the stack 2.

FIGS. 2 and 3 show a lengthwise cross section of the rotor assembly 164 having two nonmetallic nonconductive pins 5. The rotor assembly 164 has a stack 2 of magnetic laminated plates 3, the stack 2 having a central passageway 4 through which the turbocharger shaft 142 could extend, two nonmetallic nonconductive pins 5, a first collar 6 which does not contact the stack 2 of magnetic laminated plates 3, a spring washer 7 disposed between the collar 6 and the stack 2, and a second collar which does contact the stack 2 of magnetic laminated plates 3. Both the first collar 6 and the second collar 8 are round rings having a central hole 11. In FIG. 3, the turbocharger shaft 142 extends through the rotor assembly 164.

FIG. 4 shows a view of two nonmetallic nonconductive pins 5 in a plate 3. The plate 3 includes the plate central hole 14 through which a shaft 142 could extend. The pins 5 are positioned symmetrically on opposed sides of the central hole 14, whereby the pins 5 have minimal or no effect on the balance of the rotor assembly 164.

The magnetic laminated plates 3 used in the rotor assembly 146 are formed of ferromagnetic materials which are not permanently magnetized. Because of their ferromagnetic properties, the stack 2 of the plates 3 is drawn toward the magnetic fields created by current flowing through the windings of the stator 162. A wide variety of ferromagnetic alloys are known, and could be used in constructing the rotor assembly 164. However, for reasons of availability and cost, soft steel has been found to be useful to form the plates 3.

The number of nonmetallic nonconductive pins 5 in the rotor assembly 164 depends to some extent on the size of the motor 160. For larger motors that have more power, the number of nonmetallic nonconductive pins 5 could be larger in order to maintain the force transmitted by each pin 5 at an appropriate level. The number of nonmetallic nonconductive pins 5 in the rotor assembly 164 may vary from two to eight. Two to four nonmetallic nonconductive pins 5 in a rotor assembly 164 works well. The nonmetallic nonconductive pins 5 will not interfere with the magnetic fields set up within the motor 160. The size (e.g., length and cross-sectional dimension) of the nonmetallic nonconductive pins 5 can vary with the size of the motor. For larger motors that have more power, the size (e.g., the cross-sectional dimension) of the nonmetallic nonconductive pins 5 could be larger in order to withstand the higher torque each pin 5 must transmit. Nonmetallic nonconductive pins from 1.5 to 3 mm in diameter have been found to be useful in the rotor assembly 164.

The individual magnetic laminated plates in the stack 2 need not fit tightly to the shaft 142. In such a case, the rotary force applied to the elements of the rotor assembly 164 is transmitted through the nonmetallic nonconductive pins 5 to the collars 6, 8. Since the nonmetallic nonconductive pins 5 transmit rotary force, they may be made from a hard material. Hard materials suitable for use as nonmetallic nonconductive pins 5 in the rotor assembly 164 include polyetherketones, such as PEEK 450FC30, a product of Victrex Corporation, polyimide resins such as Vespel®, a product of the E. I. duPont de Nemours and company, and phenolic resins.

The collars 6, 8 fit tightly to the shaft 142 and to the nonmetallic nonconductive pin 5 and are thus able to transmit rotary force to the shaft 142. One of the collars 8 contacts the stack 2 of magnetic laminated plates 3 directly. The other collar 6 fits tightly to the shaft 142 but does not touch the stack 2 of magnetic laminated plates 3 directly. Optionally, the spring washer 7 may be placed between one of the collars 6 and the stack 2 of magnetic laminated plates 3. The stack 2 of magnetic laminated plates 3 can expand as the turbocharger 100 and motor 160 temperatures increase. The optional spring washer 7 can maintain contact between the collars 6, 8 and the stack 2 of magnetic laminated plates 3 when the motor 160 is at low temperatures as well as when the turbocharger 100 and motor 160 temperatures increase. The optional spring washer 7 also assures that the force on the nonmetallic nonconductive pin 5 when the stack 2 of magnetic laminated plates 3 expands will not cause the nonmetallic nonconductive pin 5 to stretch or deform. A variety of spring washers 7 are suitable for use in the present invention. For example bowed spring washers, Belleville washers, wave washers, and slotted disk washers are all suitable for use in the rotor assembly 164. Although the spring washer 7 offers some advantages, it is not required. If the spacing between the end collar 6 and the stack 2 of rotor laminations 3 is small there is little possibility of movement even if a spring washer 7 is not present.

While the invention has been shown and described with respect to the particular embodiments, it will be understood by those skilled in the art that various changes and modifications may be made without departing from the scope of the present invention as defined in the following claims.

What is claimed:

1. A rotor assembly (164) of a switched reluctance motor (160) comprising:
    a shaft (142);
    a stack (2) of magnetic laminated plates (3) mounted on the shaft (142);
    a first collar (6) mounted on the shaft (142) at one end of the stack (2);
    a second collar (8) mounted on the shaft (142) at an opposed end of the stack (2), wherein the first collar (6) is not in contact with the stack (2) of magnetic laminated plates (3), and the second collar (8) is in contact with the stack of magnetic laminated plates (3);
    nonconductive, nonmetallic pins (5) that are configured to transmit rotational force of the stack (2) to the shaft (142) via the first collar (6) and the second collar (8), wherein the pins (5) extend through the stack (2) of magnetic laminated plates (3) such that respective ends (5a, 5b) of the pins (5) are connected to each of the first collar (6) and the second collar (8); and
    a spring washer (7) placed between the first collar (6) and the stack of magnetic laminated plates (3).

2. The rotor assembly (164) of claim 1, wherein the pins (5) are parallel to the shaft (142).

3. The rotor assembly (164) according to claim 2 comprising two to four pins (5).

4. The rotor assembly (164) according to claim 2 wherein the pins (5) are formed of a material selected from the group consisting of polyetherketones, polyimide resins, and phenolic resins.

5. The rotor assembly (164) of claim 2, wherein the respective ends (5a, 5b) of the pins (5) are tightly fitted within openings (9) in each of the first collar (6) and the second collar (8).

6. The rotor assembly (164) according to claim 1 wherein the pins (5) are formed of a material selected from the group consisting of polyetherketones, polyimide resins, and phenolic resins.

7. The rotor assembly (164) according to claim 1, wherein the pins (5) are arranged symmetrically about a rotational axis (R) of the shaft (142).

8. The rotor assembly (164) according to claim 1, wherein the first collar (6) and the second collar (8) are fixed relative to the shaft (142).

9. An exhaust gas turbocharger (100) that includes
a compressor section (12) including a compressor wheel (130),
a turbine section (102) including a turbine wheel (112),
a bearing housing (140) that supports a shaft (142) that connects the compressor wheel
(130) to the turbine wheel (112), and
a switched reluctance motor (160) disposed in the bearing housing (140), the motor (160) comprising:
a rotor assembly (164) that includes
a stack (2) of magnetic laminated plates (3) mounted on the shaft (142);
a first collar (6) mounted on the shaft (142) at one end of the stack (2);
a second collar (8) mounted on the shaft (142) at an opposed end of the stack (2), wherein the first collar (6) is not in contact with the stack (2) of magnetic laminated plates (3), and the second collar (8) is in contact with the stack of magnetic laminated plates (3);
nonconductive, nonmetallic pins (5) that are configured to transmit rotational force of the stack (2) to the shaft (142) via the first collar (6) and the second collar (8), wherein the pins (5) extend through the stack (2) of magnetic laminated plates (3) such that respective ends (5a, 5b) of the pins (5) are connected to each of the first collar (6) and the second collar (8); and
a spring washer (7) placed between the first collar (6) and the stack of magnetic laminated plates (3).

10. The turbocharger (100) of claim 9, wherein the pins (5) are parallel to the shaft (2).

11. The turbocharger (100) according to claim 9, wherein the pins (5) are arranged symmetrically about a rotational axis (R) of the shaft (142).

12. The turbocharger (100) according to claim 9, wherein the first collar (6) and the second collar (8) are fixed relative to the shaft (142).

13. The turbocharger (100) according to claim 9, wherein the respective ends (5a, 5b) of the pins (5) are tightly fitted within openings (9) in each of the first collar (6) and the second collar (8).

* * * * *